United States Patent [19]
Gust

[11] 3,804,464
[45] Apr. 16, 1974

[54] TRUCK BODY CONSTRUCTION
[75] Inventor: Jacob N. Gust, West Fargo, N. Dak.
[73] Assignee: Frontier Corporation, West Fargo, N. Dak.
[22] Filed: Feb. 26, 1973
[21] Appl. No.: 335,802

[52] U.S. Cl............. 298/23 B, 296/28 D, 296/29
[51] Int. Cl......................... B60p 1/28, B62d 33/02
[58] Field of Search............ 296/28 D, 29; 298/23 B

[56] References Cited
UNITED STATES PATENTS

| 2,380,861 | 7/1945 | Meyer | 296/28 D |
| 2,275,349 | 3/1942 | Collender | 296/28 D |
| 3,163,463 | 12/1964 | Femrite | 296/28 D |
| 2,756,095 | 7/1956 | Schnell | 296/28 D |
| 2,886,374 | 5/1959 | Meats | 296/28 D |
| 907,254 | 12/1908 | Lied | 298/23 B |

Primary Examiner—Richard J. Johnson
Attorney, Agent, or Firm—James R. Cwayna

[57] ABSTRACT

A truck body structure including a tail gate structure and control therefore which includes a light weight floor construction including a plurality of cross beams spaced apart a predetermined distance for proper support of a floor, a body mounted thereon which body provides through its specifically designed sides a relatively strong construction requiring no external or internal bridging and which sides through their design provide a greater carrying capacity for the vehicle and a design which permits easy cleaning of the vehicle. The gate structure is designed for proper swing opening of the gate through a lift-swing construction and in combination with a locking structure a door provided on the gate may be used for emptying the body.

9 Claims, 7 Drawing Figures 3,804,464

TRUCK BODY CONSTRUCTION

In the past various types of truck bodies have been provided and the art thereon is fairly well developed. Applicant has provided herein a fabricated truck body which includes a design which will provide a substantially lighter and stronger construction which will therefore allow more load carrying capacity for the vehicle.

With applicant's concepts a relatively smooth interior truck body is provided such that the unit may be easily cleaned and which will also, due to its design, permit smooth unloading of the articles being carried therein when the same is dumped.

With applicant's device the gate for the truck body may be totally swung from the body upon dumping for rapid emptying of the unit or the gate may be held in place during emptying and a door provided on the gate may be utilized for the dumping process. With applicant's gate system the opening of the gate is automatic such that the driver is not required to leave the cab of the vehicle to attend to the same.

It is therefore an object of applicant's invention to provide a truck body structure which is extremely light in comparison to other various truck bodies and which due to its design will provide a particularly strong unit.

It is a further object of applicant's invention to provide a truck body design which is provided with smooth interior surfaces to facilitate dumping of products therefrom without damaging the same.

It is a further object of applicant's invention to provide a truck body having a strengthening side structure such that interior cross bars for side support are eliminated.

It is still a further object of applicant's invention to provide a truck body and gate combination wherein the gate may be automatically released upon raising of the body for dumping of the products contained therein.

These and other objects and advantages of applicant's invention will more fully appear from the following description made in connection with the accompanying drawings, wherein like reference characters refer to the same or similar parts throughout the accompanying views, and in which.

Figure 1:
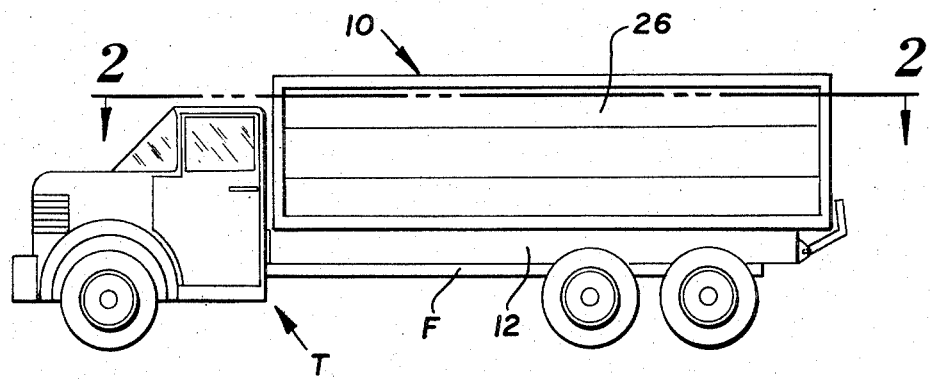
FIG. 1 is a side elevation of a truck and truck body incorporating the concepts of applicant's invention.
Figure 2:
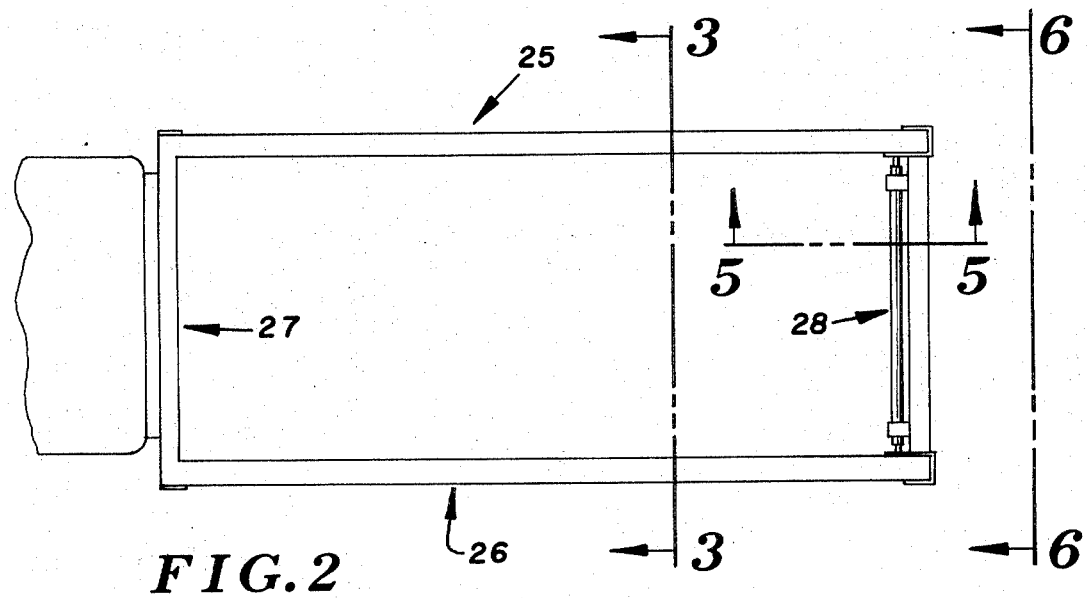
FIG. 2 is a horizontal section taken substantially along Line 2—2 of FIG. 1.

In accordance with the accompanying drawings, applicant's truck body is generally designated 10 and is illustrated in FIG. 1 mounted upon a truck T. The truck chassis normally will include at least a pair of longitudinally extending support frame members F and applicant's body 10 is designed to be pivotally mounted thereon through pivot structure 11.

Applicant's truck body 10 includes a first supporting frame structure which includes a pair of longitudinally extending frame members 12, 13 designed to extend the length of the body 10. It should be noted that the frame members 12, 13 are formed members taking the shape of inverted trapezoids having generally horizontally extending flange ends 12a, 12b, 13a, 13b at the upper portions thereof for welding the same to cross members 14 which are arranged to support the floor plate 15 thereabove. Each of the cross members 14 are of trapezoidal shape with extending flanges 14a, 14b at the upper ends thereof for attachment to the floor plate 15. The lower central portion 14c of the trapezoidal area is secured to the cross support frames 12, 13 and it should be noted that the symmetry of these cross members 14 and their outwardly extending flange attachment element 14a, 14b provide a series of properly spaced support areas for the floor plate 15 such that a substantially light weight floor plate may be utilized. Surrounding these cross members 14 and the floor plate 15 is a tubular closing and support frame consisting of sides 17, 18 and a front 19 and rear member 20. This structure including the frame members 12, 13, 14, plate 15 and sides then provides a completely formed platform and floor structure which is substantially strong but light weight.

Figure 3:
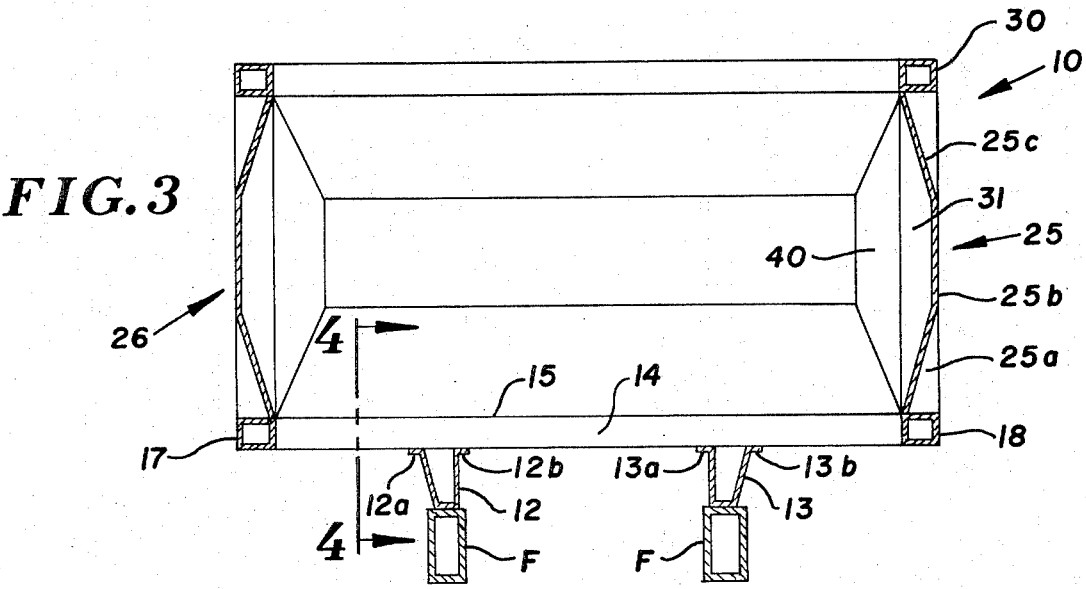
FIG. 3 is a vertical section taken substantially along Line 3—3 of FIG. 2.
Figure 4:
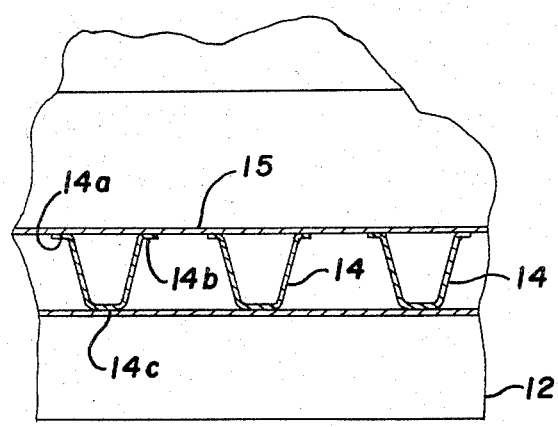
FIG. 4 is a vertical section taken substantially along Line 4—4 of FIG. 3.

Arranged in upstanding relationship to this platform construction are a pair of sides designated respectively 25, 26 a front element 27 and a rear gate section 28. The vertical cross section of these sides, front and gate element is substantially as illustrated in FIG. 3. As illustrated in FIG. 3 a discussion of one of the sides 25 will be given and it should be obvious that each of the side, front and gate formations is identical to this side. As illustrated in FIG. 3 the side structure 25 includes a continuous formed member having an upwardly and outwardly directed section 25a attached to the lower channel section 18, a vertical intermediate section 25b and an inwardly and upwardly directed section 25c provided at the upper end of the vertical section 25b. A closed rectangular member 30 extends around the upper edge of this section 25c and also about the top portion of the front and other side. This particular shape of the sides then provides a generally outwardly directed formed panel which again looking at a vertical cross section is trapezoidal in shape and in its final joined formation provides a unit of substantial strength.

Figure 7:
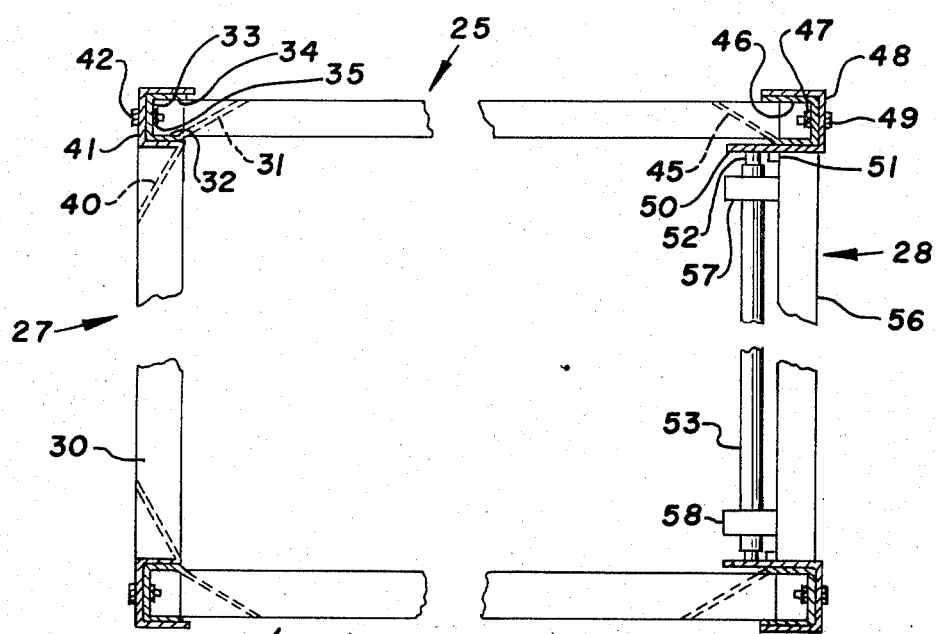
FIG. 7 is a view similar to FIG. 2 and drawn to an enlarged scale with portions thereof broken away to illustrate the particular side connective arrangement utilized.

A particular unique corner structure which again maintains the interior lines of the body is particularly illustrated in FIG. 7 which shows the means for connecting the front 27 to the two sides 25, 26 and also the means for connecting the rear gate 28 to the two sides 25, 26. As particularly illustrated in FIG. 7 and for illustrative purposes only, one such corner on the connective end of side 25 and front 27 will be discussed. As illustrated in this view a formed plate 31 is provided which again is trapezoidal in shape and therefore weldable to the interior angular arrangement formed by the sections 25a, 25b, 25c of the side 25 and which plate 31 extends forwardly generally parallel at 32 to the interior plane of the side 25 and thereafter provides a generally U-shaped section consisting of a front plate 33 and rearwardly extending plate 34 which rearwardly extending plate is again fastened rigidly to the side 25 and provides therewith a vertically extending channel and an attachment member such as a threaded nut 35 is welded therein at specific locations.

The forward end section 27 provides a plate member 40 trapezoidal in shape to permit welding thereof to the interior trapezoidal portion of the front section 27 and this plate 40 is formed to provide a capturing U section 41 to slip over the U member formed of plates 32, 33, 34 of the side 25. A threaded capturing element 42 is inserted through properly spaced apertures therein and is utilized as the connective feature between the sides and this front section.

With this structure then the trapezoidal formed plates 31, 40 are intergal with respective sides and front 25, 27 and form a smooth interior corner therefore and the same corner structures is provided at the other interior corner thereof.

The connective portion on the rear of the unit is again best illustrated in FIG. 7 and in this form a formed plate member 45 again trapezoidal in shape is welded to the formed interior side 25 and extends rearwardly therefrom to again providea tubular rectangular member 46 extending rearwardly from the end of the side 25. At least one capturing element 47 is welded or permanently attached to the interior thereof to permit the rear gate section 28 to be attached thereto.

Figure 5:
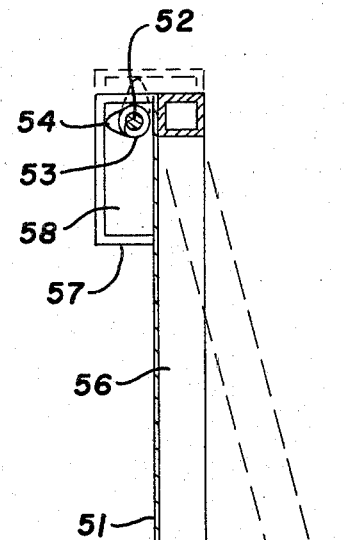
FIG. 5 is a vertical section taken substantially along Line 5—5 of FIG. 2.
Figure 5:
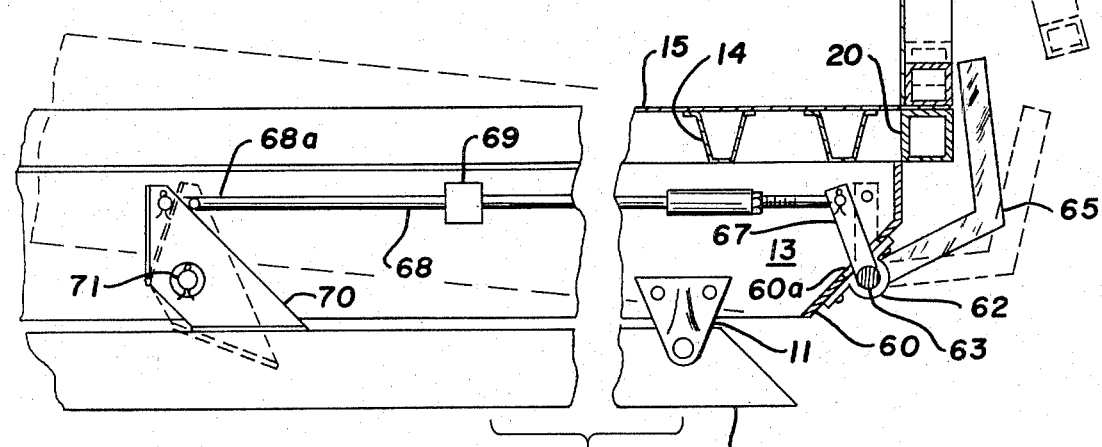

The rear gate attachment portion includes a U-shaped member 48 having passages therethrough for passage of attachment bolts 49 and the like and this U-shaped member, in the form shown, extends forwardly as at 50 to a first vertical stop element 51 for stopping the gate member 52 from swinging inwardly therepast. The extension 50 of this plate or U-shaped attachment element 48 provides a first mounting for an extending rod 52 which rod extends entirely across the rear of the truck to again be attached to a similar plate and connective device at the other side of the vehicle and a second tubular member 53 is arranged for rotation therearound. This particular structure is also illustrated in FIG. 5 and it should be noted that a cam member 54 is provided on this exterior tube 53. A pair of brackets 57, 58 are provided securely mounted to the interior of the gate 56 and these brackets provide a rectangular opening 58 therein such that the gate 56 is free to move upwardly a predetermined dimension before the lower portion of the bracket will contact with the cam controlling sleeve 53 mounted on the rod 52.

The operation of the gate is particularly illustrated in FIG. 5 wherein the gate in what could be termed a normal closed position is illustrated in dotted and solid lines and the open position or the position to allow swingability is illustrated in dotted lines. As illustrated, upon rotation of the exterior sleeve 53 through handle means (not shown) or the like the cam 54 will be shifted into a vertical position thereby urging the gate upwardly past a stop member 59 located on both sides of the lower end of gate 56 such that the gate will now be free to shift outwardly when the box and body is tilted upwardly. When it is desireable to unload the truck through other than a swinging door method a singular or dual door system 56a may be provided on the same and when this method is utilized the cam 54 remains in its locked position which serves to not only properly engage the locks 59, 59 but also to hold the upper portion of the gate against the vertical stop 51.

This rear gate structure 56 is similar to the side construction and in this form strengthening tubular sections may be provided in vertical relation spaced thereacross. This arrangement obviously is a matter of design with regard to the actual rear gate structure with the concept of importance being the relationship of opening and allowing the gate to be shifted upwardly as well as to a rotated open position.

Figure 6:
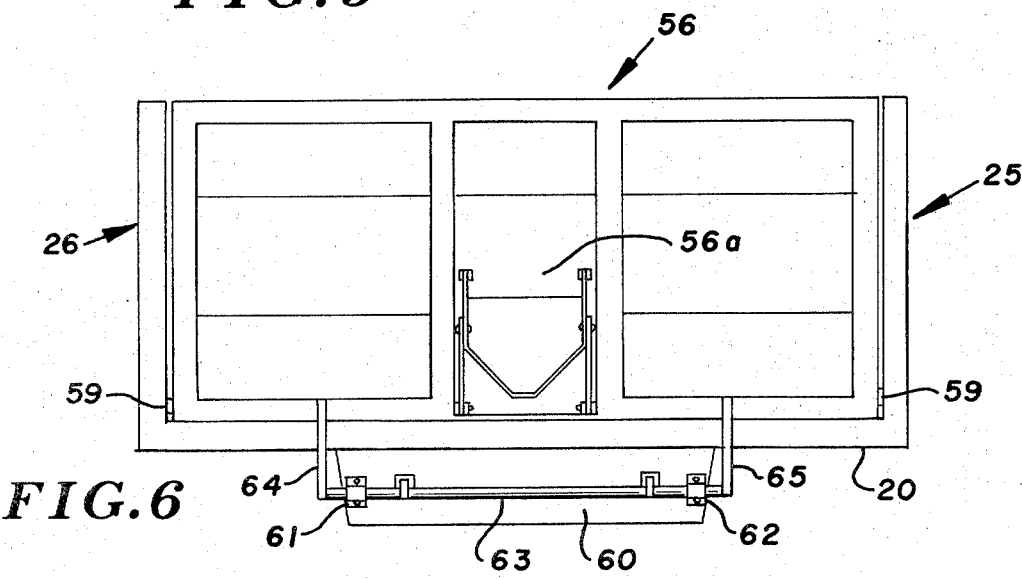
FIG. 6 is a rear elevation taken substantially along Line 6—6 of FIG. 2.

Structure for locking the gate section is illustrated in FIG. 5 and FIG. 6. In the form shown a plate member 60 is provided to extend between the supporting frames 12, 13 and a pair of bearings 61, 62 are provided thereon to house a control rod 63. Arranged on the ends of the rod 63 are a pair of upstanding lock elements 64, 65 which would normally swing up to abut with the lower portion of the rear gate 56. At least one actuating member 67, is attached and operatively connected to the rod 63 and passes through aperture 60a in the panel 60 for actuation thereby through an actuating arm 68. This rod 68 may extend through a guide yoke 69 and is attached at the inward end 68a to an actuating pivotal member 70. In the form shown this plate member 70 is pivoted upon pivot member 71 mounted on frame sections 12, 13 for movement there with and is of a shape to abut with the lower truck frame F when the truck unit is in its road or untilted position. When the box is tilted upwardly the frame 13, pivot plate 70 and gate will shift to their dotted line position. Force upon the gate will cause the hook member 65 to be shifted into the dotted line position illustrated in FIG. 5 and of course when the unit is tilted the actuating element 70 will of course be free to shift and allow the capturing element 64, 65 to move to this open position. When the unit is returned to its closed position the actuating element 70 will abut with the truck frame and will thereby be shifted into locking position drawing the actuating bar 68 inwardly and shifting the locking forks 65 into engagement with the lower rear portion of gate 56.

The operation then of the unit should be relatively simple to understand as whenever the camming element 54 is shifted to raise the gate upwardly above the stops 59 the gate will be free to swing open upon tilting of the truck body. When the truck body is so tilted the weight of the gate and the products delivered therepast will force the locks into open position and allow the gate to open. With the vertical movement of the gate allowed through the arrangement of the brackets 57, 58 a certain vertical shifting also will be permitted and therefore the aperture for the products to flow therepast will be greatly increased. When the truck body is lowered to its horizontal road travel position the reverse of this situation will take place and the gate will now be locked even though it would be in its upwardly cammed position.

With applicant's device a truck body having an extremely smooth interior is provided and this will afford ease of product movement therefrom. The unit also provides an extremely light and strong unit due to the particular configuration of the exterior sides and in the manner in which the various sides, front and rear of the same are bolted or otherwise attached together. With applicant's device the uniqueness of the formed platform members again provides a combination which is extremely strong and durable while providing a light weight unit. All of these considerations result in a truck body having particular advantages over the prior art and particularly lending itself to a unit that is highly efficient in that the pay load weight may be increased over other units.

What I claim is:

1. A truck body structure for mounting on a truck frame which frame includes at least a pair of longitudinally extending frame elements, said body including:
   a. at least one longitudinally extending, formed frame structure pivotally connected to the truck frame elements;
   b. a plurality of formed, transversely extending cross members spaced along said formed frame structure;
   c. a floor plate carried by said cross members;
   d. upstanding side members and an upstanding front member arranged to extend upwardly from said floor plate said side and front members each including a formed member substantially trapezoidal in vertical section and directed outwardly;
   e. a gate member swingably mounted between the rear ends of the upstanding side members; and,
   f. means for connecting said side and front members including formed trapezoidal sections interfitting with and integrally connected to the trapezoidal portions of each of said side and front members and having angularly disposed interlocking plate portions providing a smooth interior corner.

2. The structure set forth in claim 1 and a pair of longitudinally extending formed transversely spaced frame structures pivotally connected to the truck frame elements.

3. The structure set forth in claim 2 and said formed frame members including a formed member of a substantially inverted trapezoidal shape.

4. The structure set forth in claim 1 and said formed cross members including formed members of a substantially inverted trapezoidal shape having flanges extending from the upper edges thereof for attachment to said floor plate.

5. The structure set forth in claim 1 and a tubular, generally rectangular member circumscribing said cross members and floor plate.

6. The structure set forth in claim 1 and a generally rectangular tubular section arranged at the upper edges of said side and front members.

7. The structure set forth in claim 1 and means for mounting said gate including:
   a. a first rod extending between the rear ends of said side members;
   b. a second sleeve member mounted for rotation about said rod; and,
   c. at least one bracket member arranged on said gate and about said sleeve member permitting vertical and rotational movement of said gate about said sleeve.

8. The structure set forth in claim 7 and a cam member on said sleeve rotatable therewith to abut with said bracket and shift said gate upwardly to permit swinging thereof.

9. The structure set forth in claim 1 and
   a. gate locking means including a first camming member mounted on the body and positioned for abutment with the frame elements of the truck in a first position road travel and moveable in a second position body tilting position; and,
   b. gate contacting means controlled by said cam for locking and unlocking said gate.

* * * * *